US008886975B2

(12) United States Patent
Diab et al.

(10) Patent No.: US 8,886,975 B2
(45) Date of Patent: Nov. 11, 2014

(54) METHOD AND SYSTEM FOR MANAGING POWER CONSUMPTION UTILIZING INTER-GATEWAY COMMUNICATION

(75) Inventors: Wael William Diab, San Francisco, CA (US); Jeyhan Karaoguz, Irvine, CA (US); Xuemin Chen, San Diego, CA (US); David Garrett, Tustin, CA (US); David Lundgren, Mill Valley, CA (US); Rich Prodan, Niwot, CO (US)

(73) Assignee: Broadcom Corporation, Irvine, CA (US)

( * ) Notice: Subject to any disclaimer, the term of this patent is extended or adjusted under 35 U.S.C. 154(b) by 583 days.

(21) Appl. No.: 12/982,391

(22) Filed: Dec. 30, 2010

(65) Prior Publication Data

US 2011/0302431 A1 Dec. 8, 2011

Related U.S. Application Data

(60) Provisional application No. 61/351,696, filed on Jun. 4, 2010.

(51) Int. Cl.
| | | |
|---|---|---|
| G06F 1/26 | (2006.01) | |
| G06Q 30/02 | (2012.01) | |
| G06Q 40/00 | (2012.01) | |
| G06Q 20/10 | (2012.01) | |
| G06Q 30/04 | (2012.01) | |
| H04L 29/08 | (2006.01) | |
| H04L 12/857 | (2013.01) | |
| H04L 12/24 | (2006.01) | |

(52) U.S. Cl.
CPC ............ *G06Q 30/0226* (2013.01); *H04L 41/32* (2013.01); *G06Q 30/0215* (2013.01); *G06Q 40/12* (2013.01); *G06Q 20/10* (2013.01); *H04L 41/5019* (2013.01); *G06Q 30/04* (2013.01); *H04L 67/10* (2013.01); *H04L 47/2491* (2013.01)
USPC ......................................................... 713/320

(58) Field of Classification Search
USPC ......................................................... 713/320
See application file for complete search history.

(56) References Cited

U.S. PATENT DOCUMENTS

| | | | | |
|---|---|---|---|---|
| 7,627,401 | B2 * | 12/2009 | Benson et al. ................ | 700/295 |
| 7,653,009 | B2 * | 1/2010 | Watsen et al. ................. | 370/254 |
| 7,941,677 | B2 * | 5/2011 | Penning ........................ | 713/300 |
| 2003/0156543 | A1 | 8/2003 | Sahinoglu et al. | |
| 2006/0200542 | A1 * | 9/2006 | Willig .......................... | 709/223 |
| 2007/0206513 | A1 | 9/2007 | Cho et al. | |

(Continued)

*Primary Examiner* — Thomas Lee
*Assistant Examiner* — Eric Chang
(74) *Attorney, Agent, or Firm* — Foley & Lardner LLP; Christopher J. McKenna; Paul M. H. Pua

(57) ABSTRACT

Aspects of a method and system for managing power consumption utilizing inter-gateway communication are provided. In this regard, a first broadband gateway residing in a first location may determine past, present, and/or expected power consumption of the first location. The gateway may receive, from one or more other broadband gateways residing in one or more other locations, information that enables determining past, present, and/or expected power consumption of the other location(s). The gateway may control power consumption of the first location by controlling a state of operation of devices residing in the first location. The gateway may determine aggregate power consumption of the first location and the other location(s). The gateway may control power consumption of the first location by enabling operation of one or more devices during periods of lower aggregate power consumption and disabling operation the devices during periods of higher aggregate power consumption.

22 Claims, 6 Drawing Sheets

(56) References Cited

U.S. PATENT DOCUMENTS

| | | |
|---|---|---|
| 2008/0159304 A1 | 7/2008 | Ozugur et al. |
| 2009/0248854 A1 | 10/2009 | Conway |
| 2010/0184411 A1 | 7/2010 | Chen et al. |
| 2010/0184414 A1 | 7/2010 | Abraham et al. |
| 2010/0184450 A1 | 7/2010 | Chen et al. |
| 2010/0186027 A1 | 7/2010 | Hou et al. |
| 2010/0210239 A1 | 8/2010 | Karaoguz et al. |
| 2010/0215029 A1 | 8/2010 | Karaoguz et al. |
| 2010/0220692 A1 | 9/2010 | Diab et al. |
| 2010/0220731 A1 | 9/2010 | Diab et al. |

* cited by examiner

METHOD AND SYSTEM FOR MANAGING POWER CONSUMPTION UTILIZING INTER-GATEWAY COMMUNICATION

CLAIM OF PRIORITY

This patent application makes reference to, claims priority to and claims benefit from U.S. Provisional Patent application Ser. No. 61/351,696 filed on Jun. 4, 2010.

The above stated application is hereby incorporated herein by reference in its entirety.

INCORPORATION BY REFERENCE

This application also makes reference to
U.S. patent application Ser. No. 12/982,231 filed on Dec. 30, 2010;
U.S. patent application Ser. No. 12/982,355 filed on Dec. 30, 2010;
U.S. patent application Ser. No. 12/981,971 filed on Dec. 30, 2010;
U.S. patent application Ser. No. 12/981,993 filed on Dec. 30, 2010;
U.S. patent application Ser. No. 12/982,216 filed on Dec. 30, 2010;
U.S. patent application Ser. No. 12/982,433 filed on Dec. 30, 2010;
U.S. patent application Ser. No. 12/982,205 filed on Dec. 30, 2010;
U.S. patent application Ser. No. 12/982,353 filed on Dec. 30, 2010;
U.S. patent application Ser. No. 12/981,966 filed on Dec. 30, 2010;
U.S. patent application Ser. No. 12/982,453 filed on Dec. 30, 2010;
U.S. patent application Ser. No. 12/982,172 filed on Dec. 30, 2010;
U.S. patent application Ser. No. 12/982,429 filed on Dec. 30, 2010;
U.S. patent application Ser. No. 12/981,990 filed on Dec. 30, 2010;
U.S. patent application Ser. No. 12/982,442 filed on Dec. 30, 2010;
U.S. patent application Ser. No. 12/982,000 filed on Dec. 30, 2010;
U.S. patent application Ser. No. 12/982,010 filed on Dec. 30, 2010;
U.S. patent application Ser. No. 12/982,022 filed on Dec. 30, 2010;
U.S. patent application Ser. No. 12/981,986 filed on Dec. 30, 2010;
U.S. patent application Ser. No. 12/982,236 filed on Dec. 30, 2010;
U.S. patent application Ser. No. 12/982,091 filed on Dec. 30, 2010;
U.S. patent application Ser. No. 12/982,213 filed on Dec. 30, 2010;
U.S. patent application Ser. No. 12/982,166 filed on Dec. 30, 2010;
U.S. patent application Ser. No. 12/982,340 filed on Dec. 30, 2010;
U.S. patent application Ser. No. 12/982,073 filed on Dec. 30, 2010;
U.S. patent application Ser. No. 12/982,501 filed on Dec. 30, 2010;
U.S. patent application Ser. No. 12/982,206 filed on Dec. 30, 2010;
U.S. patent application Ser. No. 12/982,440 filed on Dec. 30, 2010;
U.S. patent application Ser. No. 12/982,171 filed on Dec. 30, 2010;
U.S. patent application Ser. No. 12/982,223 filed on Dec. 30, 2010;
U.S. patent application Ser. No. 12/982,305 filed on Dec. 30, 2010;
U.S. patent application Ser. No. 12/982,477 filed on Dec. 30, 2010;
U.S. patent application Ser. No. 12/982,331 filed on Dec. 30, 2010;
U.S. patent application Ser. No. 12/982,036 filed on Dec. 30, 2010;
U.S. patent application Ser. No. 12/982,196 filed on Dec. 30, 2010;
U.S. patent application Ser. No. 12/982,405 filed on Dec. 30, 2010;
U.S. patent application Ser. No. 12/981,753 filed on Dec. 30, 2010;
U.S. patent application Ser. No. 12/982,414 filed on Dec. 30, 2010;
U.S. patent application Ser. No. 12/981,733 filed on Dec. 30, 2010;
U.S. patent application Ser. No. 12/395,383 filed on Dec. 30, 2010;
U.S. patent application Ser. No. 12/355,537 filed on Dec. 30, 2010;
U.S. patent application Ser. No. 12/355,480 filed on Dec. 30, 2010;
U.S. patent application Ser. No. 12/372,648 filed on Dec. 30, 2010;
U.S. patent application Ser. No. 12/355,413 filed on Dec. 30, 2010;
U.S. patent application Ser. No. 12/355,377 filed on Dec. 30, 2010;
U.S. patent application Ser. No. 12/395,470 filed on Dec. 30, 2010; and
U.S. patent application Ser. No. 12/391,009 filed on Dec. 30, 2010;
U.S. patent application Ser. No. 12/982,405 filed on Dec. 30, 2010;
U.S. patent application Ser. No. 12/981,753 filed on Dec. 30, 2010;
U.S. patent application Ser. No. 12/982,414 filed on Dec. 30, 2010;
U.S. patent application Ser. No. 12/981,733 filed on Dec. 30, 2010;
U.S. patent application Ser. No. 12/395,383 filed on Feb. 27, 2009;
U.S. patent application Ser. No. 12/355,537 filed on Jan. 16, 2009;
U.S. patent application Ser. No. 12/355,480 filed on Jan. 16, 2009;
U.S. patent application Ser. No. 12/372,648 filed on Feb. 17, 2009;
U.S. patent application Ser. No. 12/355,413 filed on Jan. 16, 2009, 2009;
U.S. patent application Ser. No. 12/355,377 filed on Jan. 16, 2009, 2009;
U.S. patent application Ser. No. 12/395,470 filed on Feb. 27, 2009; and
U.S. patent application Ser. No. 12/391,009 filed on Feb. 23, 2009;

Each of the above stated applications is hereby incorporated herein by reference in its entirety.

FIELD OF THE INVENTION

Certain embodiments of the invention relate to a broadband gateway. More specifically, certain embodiments of the invention relate to a method and system for managing power consumption utilizing inter-gateway communication.

BACKGROUND OF THE INVENTION

With the continuous growth of digital television or broadcast multimedia, and/or broadband access, which may be used in conjunction with online businesses, social networks, and/or other online services and applications, users may desire having access to a larger number of providers and/or a broader range of content in a manner that is flexible and/or suits the users' lifestyles. Most users connect to the Internet using web browsers running on personal computers (PCs). Furthermore, most households may have one or more televisions that may be used to view television and/or multimedia broadcasts. Television broadcasts may include terrestrial TV, Cable-Television (CATV), satellite TV and/or Internet Protocol television (IPTV) based broadcasts. To ensure against unauthorized reception and/or use of TV and/or multimedia broadcast, service providers may require use of dedicated set-top boxes (STBs) that may be used to encrypt broadcast signals communicated from the service providers to generate suitable video and/or audio streams that may be played via televisions and/or other display/playback devices in the household. Furthermore, STBs and/or TVs may support Internet access. Thus, rather than using a computer to access the Internet, a user may find it more convenient to use the flat screen televisions and/or monitors in homes for the same purpose. To do so, for example, an STB connected to a flat screen television may be provided with web browsing software and protocols, and Internet connectivity, which may enable the user to easily access the Internet or check their electronic mail (email), for example, from a convenient and comfortable location such as their living room.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for managing power consumption utilizing inter-gateway communication, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for managing power consumption utilizing inter-gateway communication. In various embodiments of the invention, a first broadband gateway residing in a first location may determine past, present, and/or expected power consumption of the location in which it resides. The gateway may receive, from one or more other broadband gateways residing in one or more other locations, information that enables determining past, present, and/or expected power consumption of the other location(s). The gateway may control power consumption of the first location based on the results of the determining and based on the received information. The gateway may communicate the results of the determining to the other broadband gateway(s). The gateway may control power consumption of the first location by controlling a state of operation of a plurality of electronic devices residing in the first location.

The results of the determining and/or the information that enables determining past, present, and/or expected power consumption of each of the one or more other locations may be communicated to an entity that manages a power grid. The entity that manages the power grid may allocate resources for delivering power to the first location and to the other location(s) based on the results of the determining and based on the information that enables determining past, present, and/or expected power consumption of the other location(s). The entity may determine a price per unit (e.g., per kWh) of electricity delivered to the first location and to the other location(s) based on the results of the determining and on the information that enables determining past, present, and/or expected power consumption of the other location(s).

The gateway may determine aggregate power consumption of the first location and the other location(s). The gateway may control power consumption of the first location by scheduling downloading and/or consumption of content to occur at time periods of lower aggregate power consumption. The gateway may control power consumption of the first location by enabling operation of one or more devices of the first location during periods of lower aggregate power consumption and disabling operation of the devices during periods of higher aggregate power consumption. The broadband gateway may be operable to handle multiple concurrent physical layer connections to one or more network access service providers.

Figure 1:
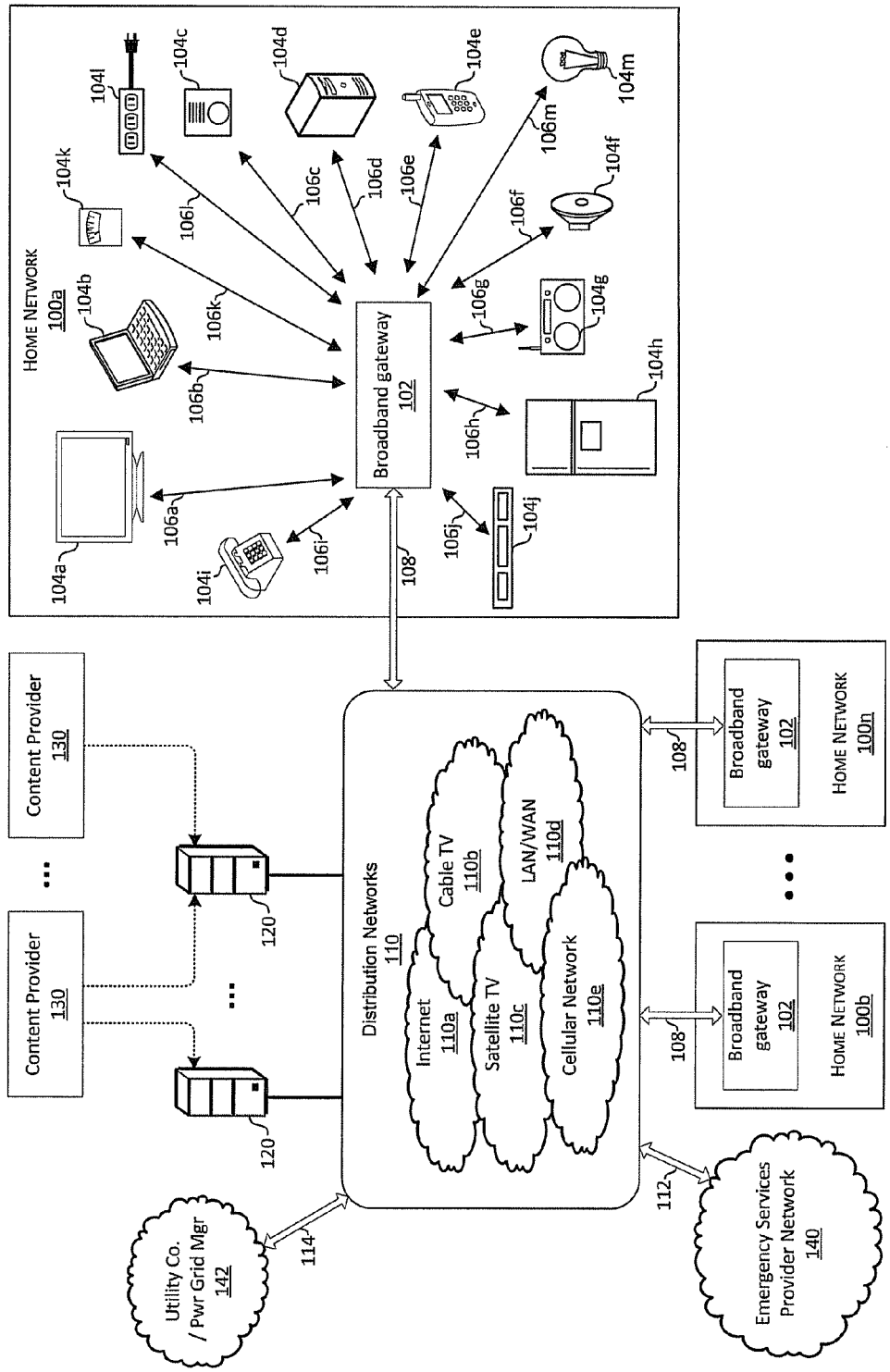
FIG. 1 is a block diagram illustrating an exemplary communication system that comprises a home network serviced by a broadband gateway, in accordance with an embodiment of the invention.

FIG. 1 is a block diagram illustrating an exemplary communication system that comprises a home network serviced by a broadband gateway, in accordance with an embodiment of the invention. Referring to FIG. 1, there is shown a home network 100a, a plurality of distribution networks 110, a plurality of service providers 120, and a plurality of content providers 130. The home network 100A may be serviced by a broadband gateway 102. Also shown in FIG. 1 are additional home networks 100b, . . . , 100n, an emergency services provider network 140, and a network of a power grid management entity 142. Each of the home networks 100b, . . . 100n may also be serviced by a broadband gateway 102.

The service providers 120 may comprise various entities which may provide various services to the devices 104 via the gateway 102 and/or to the gateway 102 itself. Some of the service providers 120 may comprise network access service providers which provide physical layer connections to the gateway 102. Such physical layer connections may then be utilized to access, and/or may be part of, one or more of the distribution networks 110. In this regard, "network access service provider" as utilized herein, is distinguished from the more generic term "service provider" which may encompass services other than providing physical layer access to a network. Cable television providers, plain old telephone service (POTS) providers, digital subscriber line (DSL) providers, cellular providers, WiMAX providers, and satellite providers are examples of network access service providers.

The content providers 130 may generate, capture, and/or package content, such as multimedia content, that may be distributed to end-users. The content may comprise, for example, audio, video, e-book, gaming, and/or other content. The content may be, for example, downloadable and/or streaming, rented and/or purchased. In some instances, a content provider and a service provider may be separate. In some instances, a single provider may provide both content and services. For example, an entity that functions as a network access service provider may also provide content and/or services other than network access and, thus, that entity may also be accurately referred to as a "content provider" and/or a "service provider." Content and/or services that are provided by a content provider 130 and/or a service provider 120 may be provided to the gateway 102 via a physical connection provided by a network access service provider 120.

The plurality of distribution networks 110 may comprise one or more networks that may be operable to enable wireless, optical, and/or wired communication among a plurality of entities based on one or more networking and/or communication infrastructures. In this regard, the plurality of distribution networks 110 may be utilized to enable distributing multimedia content generated by the content providers 130, directly and/or via the service providers 120, to end-users. The network connectivity available via the plurality of distribution networks 110 may be based on one or more communication standards and/or protocols. The plurality of distribution networks 110 may comprise, for example, the Internet 110a, a CATV network 110b, a satellite television (TV) network 110c, a wireless local area network/wide area network (LAN/WAN) 110d, and/or a cellular network 110e.

The Internet 110a may comprise a system of interconnected networks to enable exchange of data between a plurality of nodes, based on one or more networking standards, including, for example, the Internet Protocol (IP). For example, the Internet 110a may enable connectivity among a plurality of private and public, academic, business, and/or government nodes and/or networks. The physical connectivity may be provided in the Internet 110a via, for example, the Public Switched Telephone Network (PSTN), copper wires, fiber-optic cables, wireless interfaces, and/or other protocols and/or standards-based interfaces. The transport functionality may be performed in the Internet 110a based on, for example, one or more protocols, such as the Transmission Control Protocol/IP (TCP/IP), for example. The CAN network 110b may comprise suitable distribution nodes, systems, and/or subnetworks that may enable forwarding of communication between CAN providers and a plurality of cable-TV consumers. For example, the CAN network 110b may comprise a network of fiber optics and/or coaxial cables for use in CAN broadcasts. The satellite TV network 110c may comprise suitable distribution nodes, systems, and/or subnetworks that may enable communication of satellite TV broadcast by satellite TV providers to a plurality of consumers. For example, the satellite network 110c may comprise a plurality of orbiting satellite nodes and/or one or more terrestrial centers in a satellite-TV system.

The LAN/WAN network 110d may comprise suitable logic, circuitry, interfaces, and/or code that may be operable to enable implementation of one or more wired and/or wireless LAN or WAN standards and/or protocols. Exemplary WAN technologies comprise, for example, WiMAX-based networks. Exemplary LAN technologies may comprise, for example, those based on IEEE 802.11 standards, including, for example, WiFi-based networks. The cellular network 110e may comprise suitable logic, circuitry, interfaces and/or code that may be operable to enable communication via one or more cellular technologies. Exemplary cellular technologies may comprise Code Division Multiple Access (CDMA), wideband CDMA (WCDMA), CDMA1000, High-Speed Downlink Packet Access (HSDPA), Global System for Mobile Communications (GSM), General Packet Radio Services (GPRS), Enhanced Data Rates for Global Evolution (EDGE), and/or Universal Mobile Telecommunication System (UMTS). The cellular network 110e may comprise, for example, a plurality of control and/or switching nodes, and a plurality of base stations that enable transmission and/or reception of cellular based communications between the cellular network 110e and cellular capable devices.

The home network 100a may correspond to a location that may comprise a plurality of devices 104 which may be serviced and/or managed by the broadband gateway 102. In this regard, the location may be a residence (e.g., home, apartment), a small business, a school, a library, and/or other like settings in which users may want to obtain access to service and/or to content provider networks. The broadband gateway 102 may be utilized in the home network 100a to provide connectivity between the home network 100a and the service providers 120 (and/or the content providers 130) via the distribution networks 110.

The broadband gateway 102 may comprise suitable logic, circuitry, interfaces, and/or code that may be operable to provide connectivity between one or more devices in a home network, such as the home network 100a, and a plurality of external networks. For example, the broadband gateway 102 may handle a plurality of broadband physical layer connections 108 to the distribution networks 110. The broadband physical layer connections 108 may comprise wired, optical, and/or wireless connections between the broadband gateway 102 and the distribution networks 110. The broadband gateway 102 may operate as an interface device that may allow one or more service and/or content providers to interact with various devices in the home network. In this regard, the broadband gateway 102 may be operable to perform and/or provide various services that may pertain to enabling and/or facilitating reception of content from one or more content providers, wherein the content may be delivered through one or more services providers. For example, the broadband gateway 102 may be operable to perform such operations as network access related processing (e.g., PHY/MAC, transport layer processing), encryption and/or decryption, user and/or account authentication, and/or at least some of video and/or audio processing operations that may be needed for consumption of multimedia content. The broadband gateway 102 may communicate with various devices in the home network 100, using wired and/or wireless communication links.

A single gateway 102 may be operable to handle multiple physical layer (i.e., layer 1 of the open-systems interconnection model (OSI)) connections 108 to multiple ones, or portions, of the distribution networks 110, where different ones or portions of the distribution network(s) 110 are owned, operated, leased, or otherwise associated with different network access service providers 120. For example, a first network access service provider 120 may provide network access to the gateway 102 via a DSL connection over twisted-pair cabling, and a second network access service provider 120 may provide network access to the gateway 102 via a cable television connection over coaxial cabling. In some instances, the gateway 102 may be operable to concurrently communicate over multiple physical layer connections 108 provided by multiple network access service providers 120.

The broadband gateway 102 may also be operable to provide and/or support various other, non-content related services in the home network 100. For example, the broadband gateway 102 may be operable to provide energy management in the home network 100a, by controlling and/or adjusting configuration of one or more devices in the home network to reduce power consumption for example.

Devices serviced by, and/or connected with the broadband gateway 102 may comprise content consuming devices and/or other, non-content consuming household or home devices that may be operable to interact with the broadband gateway 102. For example, the broadband gateway 102 may service, and/or may communicate with a plurality of home devices 104a-104m in the home network 100a. The devices 104a-104m may each be referred to as a communication device or an electronic device. The home devices may comprise, for example, one or more of a television 104a, a laptop computer 104b, a smoke detector, a carbon monoxide detector, and/or a security alarm 104c, a computer and/or server 104d, a mobile phone 104e, a speaker 104f, an AM/FM radio 104g, a phone 104h, an appliance 104i (e.g., refrigerator), a digital video recorder (DVR) or personal video recorder (PVR) 104j, a thermostat or other environmental control(s) 104k, a power strip 104l, and lighting systems and/or controls 104m. The broadband gateway 102 may interact with each of the home devices 104a-104m via links 106a-106m, which may be supported by the broadband gateway 102 and the corresponding home device. For example, the link 106a between the broadband gateway 102 and the television 104a may comprise a High-Definition Multimedia Interface (HDMI) cable. The link 106b may comprise, for example, a wired Ethernet link, a wireless Ethernet link, a Universal Serial Bus (USB) link, or an IEEE 1394 link. The link 106c may comprise, for example, a two-wire link or a wireless link. The link 106d may comprise, for example, a wired Ethernet link, a wireless Ethernet link, a USB link, or an IEEE 1394 link. The link 106e may comprise, for example, a wireless Ethernet link, a USB link, or a cellular link. The link 106f may comprise speaker wire and/or a wireless link. The link 106g may comprise, for example, AM and/or FM radio transmissions broadcast received using the broadband gateway 102. The link 106h may comprise, for example, a phone line. The link 106i may comprise, for example, a wired or wireless Ethernet link. The link 106j may comprise, for example, a wired or a wireless link. The link 106k may comprise, for example, a wired or wireless link. The link 106m may comprise, for example, a wired or wireless link.

The power strip 104l may comprise one or more outlets and may comprise one or more plugs or other means of connecting to a power supply, such as a wall outlet. The power strip 104l may comprise suitable logic, circuitry, interfaces, and/or code that may be operable to measure and/or monitor energy consumed via one or more of its outlets, enable and disable consumption of power via one or more of its outlets, and/or limit current drawn via one or more if its outlets. The power strip 104l may be operable to communicate energy measurements via the link 106l. Also, enabling, disabling, limiting, or otherwise controlling power consumed via one or more outlets of the power strip 104l may be performed in response to messages received via the link 106l. The link 106l may comprise a wired or wireless link. The power strip 106l may be operable to communicate with the gateway 102 utilizing power line communication. For example, the gateway 102 may be plugged into an outlet of the power strip 106l and communicate with the gateway 102 via that outlet, or the gateway 102 and the power strip 104l may each be plugged into a common power distribution system.

As illustrated in FIG. 1, a plurality of home networks 100b, 100n, may also be connected to the distribution networks 110. These home networks 100b, 100n may operate in substantially the same manner as the home network 100a. By having multiple home networks connected to the distribution networks 110, various applications, such as peer-to-peer communication and/or data aggregation operations may be possible by utilizing the broadband gateways 102 in the home networks.

In operation, the gateway 102 may track usage and/or power consumption of one or more of the devices 104a-104m to determine a past, present, and/or expected power consumption of the home network 100a. Tracking usage may comprise, for example, collecting information such as a state of operation of one or more of the devices 104a-104m over time. The determined power consumption may be stored in memory in the gateway 102 and may be utilized when making energy management decisions. The determined past, present, and/or expected power consumption, and/or other information collected while tracking usage and/or power consumption of the home network 100a, may be communicated to other broadband gateways. In this regard, the gateway 102 may exchange power-consumption-related information with other gateways in other locations and the exchanged information may be utilized by the gateway 102 and the other gateways to manage aggregate power consumption of the locations in which the gateways reside.

The gateway 102 may manage power consumption by configuring one or more of the devices 104a-104m. Configuring one or more of the devices may comprise configuring a state of operation of one or more of the electronic device(s) 104a-104m. Configuration of one or more of the devices 104a-104m may be scheduled by the gateway 102 utilizing a clock and/or calendar function of the gateway 102. Managing aggregate power consumption may include the gateway 102 negotiating with other gateways to determine how much power is available at any given time and determine how to best utilize the available power.

In an exemplary embodiment of the invention, one or more of the devices 104a-104m, the gateway 102, and/or portions of the gateway 102 (e.g., communication interfaces) may be configurable between a plurality of states comprising: a powered-off state, a standby state, and a powered-on state. A powered-off state of a device 104x may be one in which the device 104x draws little or no current. A standby state of a device 104x may be a state in which the device 104x draws more power than the powered-off state in exchange for the device 104x being able to enter a powered-on state more quickly. A powered-on state may be one in which the device 104 is ready for immediate, or almost-immediate, use. Accordingly, during periods of higher aggregate power consumption, the gateway 102 may attempt to configure as many of the devices as possible into a powered-off or standby mode. Conversely, during periods of lower aggregate power consumption, additional devices may be in a standby or powered-on state.

In an exemplary embodiment of the invention, configuring a particular device $104_X$ may depend of the type of device, the function(s) of the device, and/or the capabilities of the device. For example, configuring the thermostat 104k may be comprise adjusting a temperature set point, configuring an appliance 104i, such as a hot water heater, may comprise enabling and disabling the appliance, and configuring the lighting system 104m may comprise turning lights on and off and/or opening or closing window shades via one or more electric motors.

The gateway 102 may also manage power consumption by scheduling tasks to be performed by it and/or by one or more of the devices 104a-104m. For example, downloads of content, data back-ups to server 104d, and/or running of a pool-filter, dishwasher, or other appliance may be scheduled for times periods that are determined or expected to be periods of lower aggregate power consumption.

Figure 2:
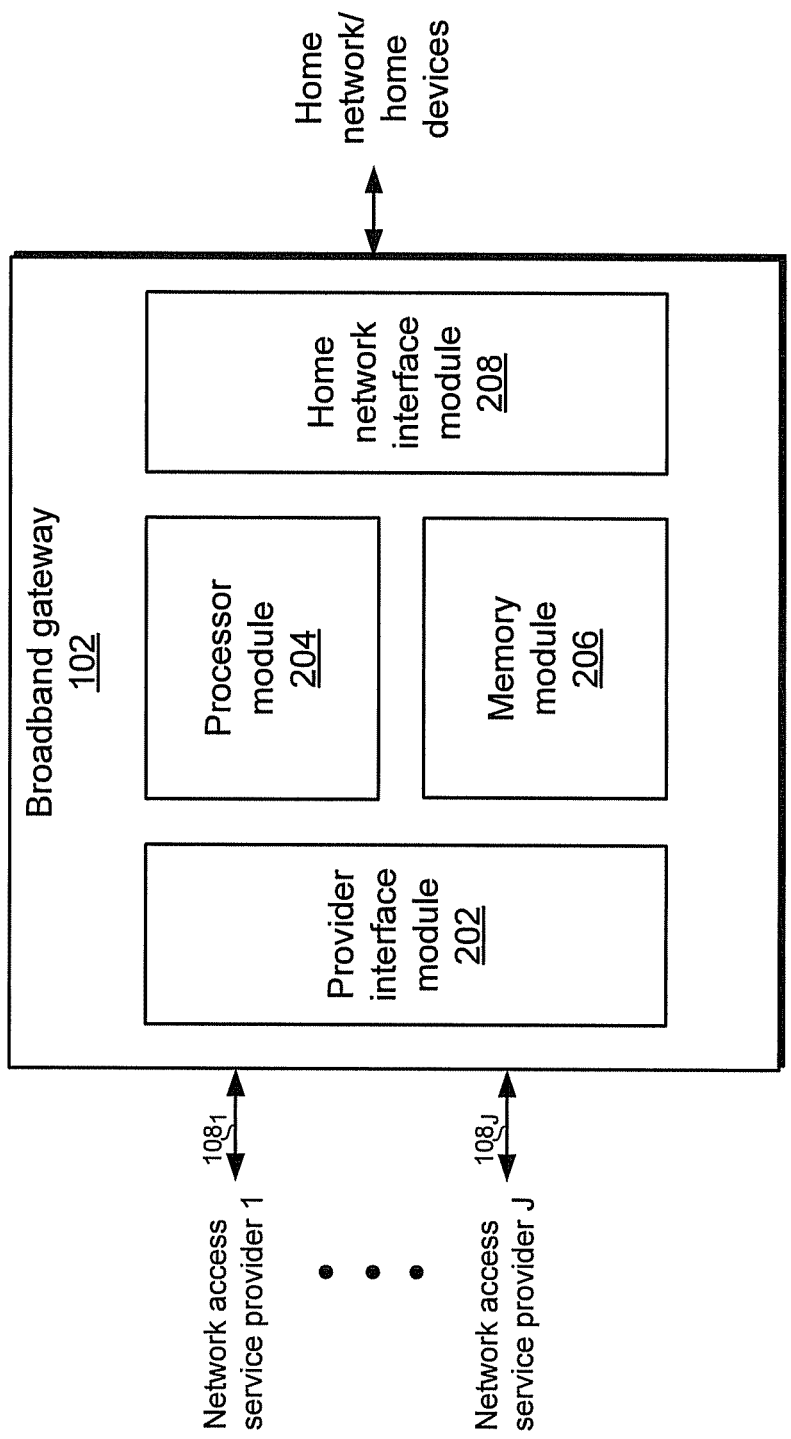
FIG. 2 is a block diagram illustrating an exemplary broadband gateway, in accordance with an embodiment of the invention.

FIG. 2 is a block diagram illustrating an exemplary broadband gateway, in accordance with an embodiment of the invention. Referring to FIG. 2, the broadband gateway 102 may comprise suitable logic, circuitry, code, and/or interfaces that may be operable to provide connectivity between one or more networks, such as the distribution networks 110 shown in FIG. 1, for example, and one or more devices in a home network, such as the home devices 104a-104j in the home network 100a shown in FIG. 1. In this regard, the broadband gateway 102 may operate as an interface device that allows one or more devices in the home network to access one or more networks, and to access various services and/or content via those one or more networks. For example, the broadband gateway 102 may be utilized to enable interaction between the plurality of service providers 120 and/or the plurality of content providers 130, and the home devices 104a-104j.

The broadband gateway 102 may communicate with the various devices via a home network that may comprise wired, optical, and/or wireless communication links, such as the home network 100a. In this regard, the broadband gateway 102 may comprise suitable hardware and/or software to provide some or all of the functions and/or operations of one or more of a modem, a router, and a switch. The modem functions and/or operations may be those of a digital subscribed line (DSL) modem, a cable modem, and/or a wireless cable modem, for example. The router functions and/or operations may be those of a wireless router, for example. The switch functions and/or operations may be those of a network switch, or a local area network (LAN) switch, for example. In some instances, the broadband gateway 102 may communicate with the various devices in the home via more than one home network.

The broadband gateway 102 may comprise one or more modules. Each of these modules may comprise hardware, software, or a combination thereof that may be utilized to perform various operations associated with the broadband gateway 102. In an embodiment of the invention, the broadband gateway 102 may comprise a provider interface module 202, a processor module 204, a memory module 206, and a client network interface module 208. In some instances, the broadband gateway 102 may be such that the various modules listed above may be distributed over multiple devices. Moreover, the modules listed above are provided by way of illustration and not of limitation. Other configurations and/or architectures of the broadband gateway 102 may also be implemented. For example, the broadband gateway 102 may be a virtual gateway that is setup in a network by utilizing virtual machines (VMs) and/or next-generation (NG) data centers.

The provider interface module 202 may comprise suitable logic, circuitry, code, and/or interfaces that may be operable to receive data from and/or send data to one or more service/content providers via one or more physical layer connections 108 to one or more network access service providers. In this regard, each of the physical layer connections $108_1$-$108_J$ may connect the gateway 110 to a different network access service provider. Each of the physical layer connections 108 may comprise a wired, optical, or wireless connection. Each of the physical layer connections 108 may utilize different physical media and/or different physical layer protocols. For example, the connection $108_1$ may comprise a DSL over twisted-pair connection and the connection $108_J$ may comprise a CATV over coaxial cable connection.

The processor module 204 may comprise suitable logic, circuitry, code, and/or interfaces that may be operable to process data received from the service/content providers and/or data received from one or more devices 104 in the home. Data from one or more devices 104 may comprise user input such as feedback regarding consumed content and responses to questionnaires, surveys, and polls. Data received from the service/content providers via one or more the physical layer connections $108_1$-$108_J$ may be processed to make it suitable for communication to a device 108 and data from the one or more devices 104 may be processed to make it suitable for communication to the service/content providers via one or more the physical layer connections $108_1$-$108_J$. In this regard, the processor module 124 may comprise one or more portions that are suitable to handle certain types of data such as video data and/or audio data, for example. The processor module 204 may also be operable to generate a graphical user interface (GUI) which may be manipulated via which a user may provide input. The GUI may be displayed as part of an OSD on a local device 104, such as a monitor or television, and may be manipulated via a remote control and/or other input device that communicates directly with the gateway 102. The GUI may be a web-based interface, and a user may interact with it via a computer and web browser. The GUI may be customized based on characteristics of the gateway 102, the device 104 coupled to the gateway, and the service and/or content providers associated with the gateway 102. The processors module 124 may utilize the memory 206 in performing its functions.

The memory module 206 may comprise suitable logic, circuitry, code, and/or interfaces that may be operable to store data utilized in the operations of the broadband gateway 102. For example, the memory module 206 may be utilized to store configuration data, parameters, device information, tracking and/or monitoring information, security information, and intermediate processing data, for example. The memory module 206 may comprise storage media that may be integrated in the broadband gateway 102 and/or may be removable such as a removable storage device.

The client network interface module 208 may comprise suitable logic, circuitry, code, and/or interfaces that may be operable to receive data from and/or send data to one or more devices in the home network. The client network interface module 208 may be operable to support multiple communication protocols, standards, and/or data transport technologies. In this regard, the client network interface module 208 may handle one or more physical layer connections to one or more devices 104. For example, the client network interface module 208 may comprise, one or more wired and/or wireless Ethernet interfaces, one or more analog and/or digital audio outputs, one or more audio/video interfaces such as such as HDMI and DisplayPort, one or more USB interfaces, one or more IEEE 1394, and/or one or more telephone jacks.

The broadband gateway 102 may be operable to provide energy management by varying the configuration of one or more devices in the home network. The broadband gateway 102 may collect and/or store energy-related information of the devices in the home network and/or of the links in the home network, and may utilize such information to control the operation of the home devices. For example, the broadband gateway 102 may utilize channel capacity flexibility and content coding options to minimize and/or optimize power utilization. The broadband gateway 102 may also configure and/or manage the configuration of the network between the broadband gateway 102 and one or more service/content providers based on the energy-related information associated with the devices in the home. For example, at least a portion of the distribution networks 100 may be configured and/or managed in this manner. The broadband gateway 102 may be utilized to display energy-related metrics, including consumption trends and/or costs, for example, and to display any available credits/rewards that may be redeemed by an account holder. In some instances, when a device in the home network is a certified device, such as a California efficient display, for example, the broadband gateway 102 may be utilized to provide that information to a service/content provider and obtain rewards/credits associated with the use of such certified devices. Moreover, overall network power consumption may be managed by sharing information among multiple interconnected broadband gateways.

The broadband gateway 102 may be operable to adapt and/or enable changes in a subscription model and/or in multimedia delivery characteristics based on the capabilities of the various devices in the home network. For example, high-definition video content may be delivered to certain type of devices, such as digital televisions (DTVs), while low-definition video content and/or text may be delivered to a different type of devices, such as personal mobile devices. In this regard, the broadband gateway 102 may be utilized to reduce bandwidth and/or processing power consumption in the home network. The broadband gateway 200 may also support and/or use multi-transport processing, which may be performed sequentially, in parallel, and/or utilizing distributed processing.

The gateway functionality associated with a user, such as security features, preferences, applications, electronic programming guides (EPGs), and user profile, for example, may be ported from the broadband gateway 102 to one or more other broadband gateways 102 in other locations. In some instances, a visitor may be allowed access to their content outside their service/content provider service area by, for example, classifying the access level for different users and/or by providing limited access to content. Moreover, the broadband gateway 102 may allow multiple user interface software structures by, for example, standardizing an interface to service/content providers and devices in the home network.

The broadband gateway 102 may be operable to broker and/or arbitrate with service/content providers the consumption of certain services, such as music and video, for example. In some instances, the broadband gateway 102 may perform content search, transport discovery, ranking, and/or sorting. These operations may be performed based on content quality, price, quality-of-service (QOS), and network protocols supported by the devices in the home network, such as service level agreements (SLAs), for example.

Various emergency-related services in the home network may be supported by the broadband gateway 102, including allowing first responders to provide alerts to a select group of users by accessing the broadband gateway 102 via secure links provided by the service/content providers. For example, the broadband gateway 102 may enable an emergency service provider, such as those associated with the emergency service provider network 140 described above in FIG. 1, to access one or more devices in the home network.

For peer-to-peer communication, the broadband gateway 102 may be utilized to allow enhanced content sharing in a service/content provider network. In this regard, the broadband gateway 102 may be utilized to construct a directory service for peer-to-peer connectivity with friends and family, for example. The broadband gateway 102 may be utilized to provide incentives to users who engage in peer-to-peer communication through, for example, the distribution networks 110. Moreover, the broadband gateway 102 may be utilized to match the content coding to the service type being consumed by the user and to make the necessary allocations through the network with respect to peer-to-peer or conventional Internet programming or broadcast programming.

The broadband gateway 102 may be utilized in connection with constrained network resources, such as time of day, traffic congestion, and the like, for example, to provide incentives for a user to accept a lower cost, lower quality of service that is dynamically configured for current network conditions. In some instances, the broadband gateway 102 may allow enhanced low latency service delivery to client devices in a home network.

The broadband gateway 102 may be operable to run or execute an agent to extract content, rating, copyright, language, privacy rules, and automatically add user-generated content, for example. Such agent may be run or executed in connection with the processor module 204 of the broadband gateway 102, for example. In some instances, the broadband gateway 102 may be operable to provide rating-related information or channel prediction to a service/content provider to assist with fast channel change.

Bandwidth optimization by, for example, placing future requests for bandwidth to a service/content provider and accepting the best timeslots provided in return may be enabled by the broadband gateway 102.

The broadband gateway 102 may be operable to combine and/or blend multiple contents for use as single content in the home network. Such combination may be performed in one or more of the modules of the broadband gateway 102. For example, the broadband gateway 102 may blend different video and audio contents for an event by accessing one or more service/content providers and providing automatic and/or manual content synchronization.

The protection, management, and/or tracking of confidential data, such as health and financial records, for example, by tagging the data may be provided by the broadband gateway 102. Only when a user authorizes the transfer of the confidential data will such data be stored and/or aggregated. The broadband gateway 102 may be operable to create a trusted rating mechanism for content. The broadband gateway 102 may be secure against external threats that may be downloaded from outside the home network and may provide a secure domain distribution in the home network. Automated and secured billing and payment services may also be provided by the broadband gateway 102.

The broadband gateway 102 may be operable to utilize client or home device profile information to select layered video service(s) and/or transmission. Such information may be stored, at least temporarily, in the memory module 206 of the broadband gateway 102. In some instances, the programming and/or enhanced video layers received by the broadband gateway 102 may be aggregated midstream by one or more network or routing nodes.

The broadband gateway 102 may support a reduction in the cost of unwatched content by using multi-tier billing for downloaded content, such as video content. The broadband gateway 102 may be utilized to provide a unified payment portal for collecting and/or aggregating charges from multiple service and/or content providers.

In operation, communications with the devices 104 via the home network interface module 208 may be utilized to determine power consumption of the devices 104, and/or other information regarding the devices 104. The information received via the module 208 may be utilized by the processor module 204 to determine past, present, and/or expected power consumption of the devices 104. Information received may be stored in the module 206. Communications with other gateways via the module 202 may enable the gateway 102 to determine past, present, and/or expected power consumption of other locations. In this regard, the gateway 102 may communicate and/or negotiate with other gateways via the module 202 in order to manage aggregate power consumption in or of multiple locations.

Figure 3A:
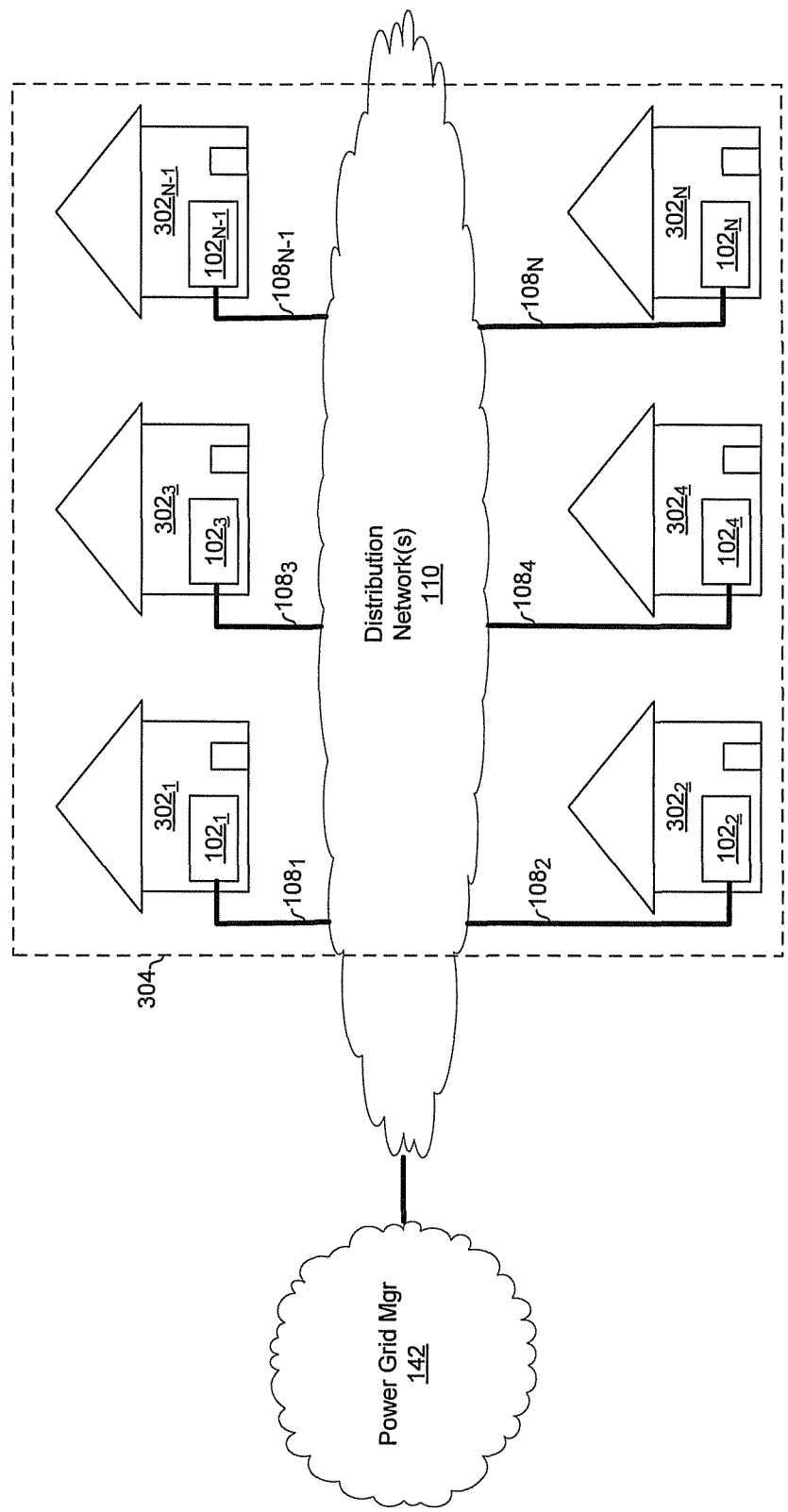
FIG. 3A is a diagram illustrating exemplary management of aggregate power consumption via inter-gateway communications, in accordance with an embodiment of the invention.

FIG. 3A is a diagram illustrating exemplary management of aggregate power consumption via inter-gateway communications, in accordance with an embodiment of the invention. Referring to FIG. 1 there is shown the network 142 communicatively coupled to broadband gateways $102_1$-$102_N$ in corresponding locations $302_1$-$302_N$ via one or more distribution networks 110 and physical layer connections $108_1$-$108_N$. The distribution network(s) 110 may be as described with respect to FIG. 1. The physical layer connections 108 may be as described with respect to FIGS. 1 and 2. N may be any integer greater than or equal to 1.

The locations $302_1$-$302_N$ may be geographically grouped and/or logically grouped into a group 304. In instances that the locations $302_1$-$302_N$ are geographically grouped, then they may be serviced by a common portion, e.g., a particular sub-station, of a power grid. The locations $302_1$-$302_N$ may be logically grouped by, for example, the energy customers at those locations joining a cooperative or in some other way agreeing to distribute energy costs among them. Managing the aggregate power consumption of the locations $302_1$-$302_N$ may enable reducing the peak load on the resources, for example, the sub-station, that serves the group 304. In this manner, the cost of owning and/or operating the sub-station may be reduced. Accordingly, the utility company may pass these savings onto the customers in the locations $302_1$-$302_N$. For example, power may be delivered to the group 304 at $X per kilowatt as long as the instantaneous power being consumed by the group 304 is below Y kilowatts, but may increase to $Z per kilowatt when instantaneous power being consumed by the group 304 is above Y kilowatts.

The network 142 may, for example, be a network of a utility company and/or other company that manages a power grid or a "smart" power grid. That is, the network 142 may enable intelligently managing the distribution of power to various locations such as individual homes, businesses, neighborhoods, and/or cities.

In operation, the gateways $102_1$-$102_N$ may communicate with each other to determine past, present, and/or future/expected power consumption of the locations $302_1$-$302_N$. Each gateway $102_X$ may then configure its associated devices 104, schedule configuration of its associated devices 104, schedule various tasks to be performed by the gateways $102_X$, and/or schedule tasks to be performed by its associated devices 104 based on the aggregate power consumption. For example, the gateways $102_1$-$102_N$ may attempt to coordinate power consumption in order to evenly distribute the aggregate power consumption of the locations $302_1$-$302_N$ over time. For example, the gateways $102_1$-$102_N$ may negotiate when each location may utilize power-hungry appliances, such as washers, dryers, and pool filters in order to minimize the number of such appliances that are running concurrently.

Information communicated among the gateway $102_1$-$102_N$ may additionally or alternatively be communicated to the network 142. For example, the gateways $102_1$-$102_N$ may communicate and/or negotiate with each other to coordinate power consumption for a period of time. The results of those communications/negotiations may then be communicated to the network 142 and the network 142 may utilize that information in allocating resources for powering the locations $302_1$-$302_N$.

Figure 3B:
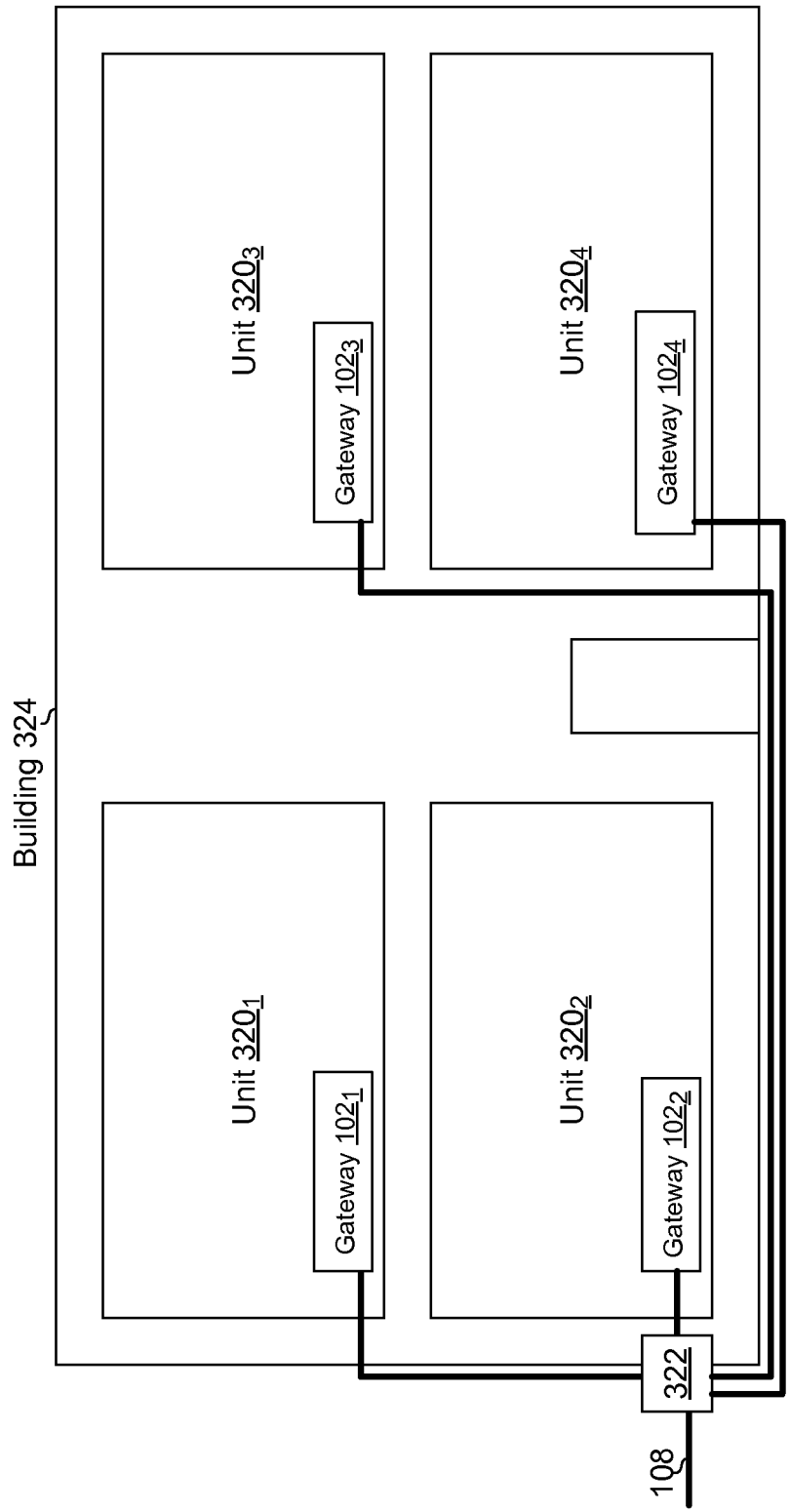
FIG. 3B is a diagram illustrating exemplary management of aggregate power consumption via inter-gateway communications, in accordance with an embodiment of the invention.

FIG. 3B is a diagram illustrating exemplary management of aggregate power consumption via inter-gateway communications, in accordance with an embodiment of the invention. Referring to FIG. 3B, there is shown locations $320_1$-$320_4$ corresponding to units of a multi-tenant building 324. Also shown are gateways $102_1$-$102_4$, each of the gateways being associated with one of the locations $320_1$-$320_4$. The gateways $102_1$-102 may connect to one or more distribution networks 110 via network equipment 322 which may comprise, for example, a splitter, multiplexer, and/or amplifier.

In operation, the gateways $102_1$-$102_4$ of the building may exchange power consumption related information to coordinate operation and/or configuration of electronic devices in the building 324 and/or coordinate the performance of various tasks requiring electricity in the building 324. The exchanged information may, for example, be utilized to spread power consumption in the building 234 over time, thus reducing peak power consumption in the building 324. In an exemplary embodiment of the invention, communications between the gateways $102_1$-$102_4$ in the building 324 may enable tracking power consumption in each unit $320_1$-$320_4$ such that power costs may be allocated among the units $320_1$-$320_4$ in proportion to power consumed. That is, the building may receive a single energy bill and the bill may be apportioned among the units $320_1$-$320_4$ based on power consumed by each of the units $320_1$-$320_4$.

Although a multi-tenant unit is shown, the building 324 could be single residence comprising multiple gateway-equipped rooms 320 and/or a single business comprising multiple gateway-equipped offices 320 and/or conference rooms 320.

Figure 4:
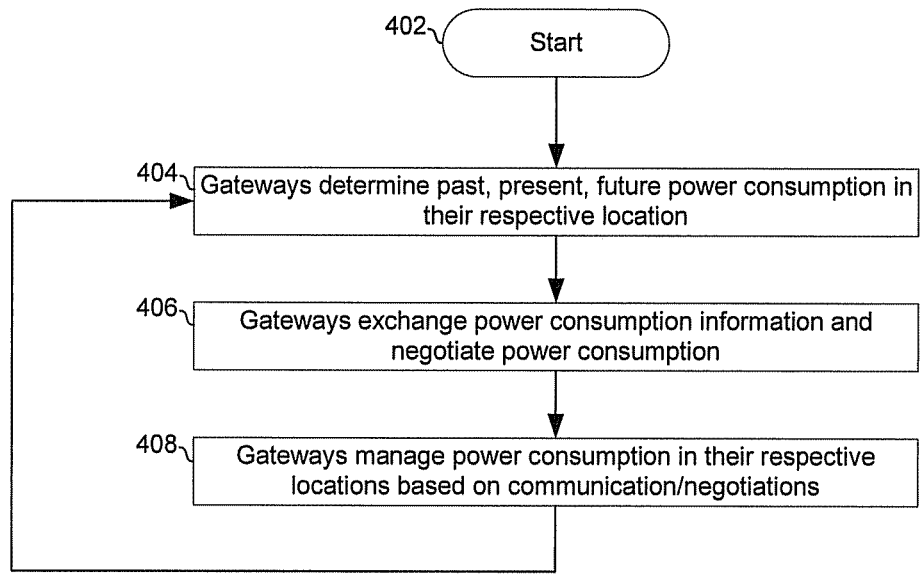
FIG. 4 is a flowchart illustrating exemplary steps for managing aggregate power consumption utilizing a plurality of gateways, in accordance with an embodiment of the invention.

FIG. 4 is a flowchart illustrating exemplary steps for managing aggregate power consumption utilizing a plurality of gateways, in accordance with an embodiment of the invention. Referring to FIG. 4, after start step 402, in step 404, each of the gateways $102_1$-$102_N$ may monitor usage and/or activity in its respective one of the locations $302_1$-$302_N$. In this regard, each gateway $102_X$ may collect information regarding past power-consuming activities, present power-consuming activities, and future power-consuming activities. Future power-consuming actives may be determined utilizing, for example, a calendar and/or clock function of the gateway $102_X$. The gateway 102 may also be operable to prioritize future power-consuming activities. For example, activates may be classified as "required" or "desired." Information collected and/or generated during step 404 may be utilized to determine past, present, and/or expected/predicted power consumption of the location $302_X$.

In step 406, the gateways $102_1$-$102_N$ may communicate with one another to determine past, present, and/or expected aggregate power consumption by the group 304. Based on the aggregate power consumption, the gateways $102_1$-$102_N$ may negotiate with one other, e.g., utilizing a bidding process, to determine the amount of power that each of the locations $302_1$-$302_N$ will utilize and/or be allocated during various time periods. Such negotiations may provide incentives, such as reduced price per unit of power, for deferring power consumption to more inconvenient and/or off-peak times.

In step 408, each of the gateways $102_1$-$102_N$ may manage power consumption in their respective locations in accordance with the negotiated power consumption allocation determined in step 406. For example, based on an amount of power that is allocated to the location $302_X$ during a particular time period, the gateway $102_X$ may determine which tasks to perform during that time period and/or determine how to configure devices 104 in the location $302_X$ during that time period. The gateway $102_X$ may schedule the power-consuming activities to occur during that particular time period and then the steps may return to step 404.

Figure 5A:
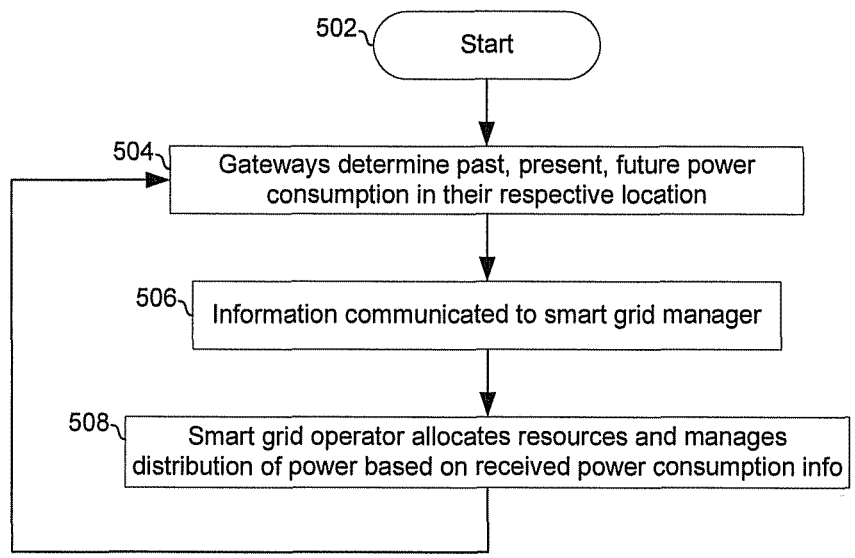
FIG. 5A is a flowchart illustrating exemplary steps for smart grid management utilizing inter-gateway communication, in accordance with an embodiment of the invention.

FIG. 5A is a flowchart illustrating exemplary steps for smart grid management based on interaction among broadband gateways, in accordance with an embodiment of the invention. Referring to FIG. 5, after start step 502, in step 504, each of the gateways $102_1$-$102_N$ may monitor usage and/or activity in its respective one of the locations $302_1$-$302_N$. In this regard, each gateway $102_X$ may collect information regarding past power-consuming activities, present power-consuming activities, and future power-consuming activities in the location $302_X$. Future power-consuming actives may be determined utilizing, for example, a calendar and/or clock function of the gateway $102_X$. The gateway 102 may also be operable to prioritize future power-consuming activities. For example, activates may be classified as "required" or "desired." Information collected and/or generated during step 504 may be utilized to determine past, present, and/or expected/predicted power consumption in the location $302_X$.

In step 506, one or more of the gateways $102_1$-$102_N$ may communicate the determined past, present, and/or predicted power consumption information to a network of an entity that manages a power distribution system (a "smart grid" manager).

In step 508, the smart grid manager may allocate power distribution resources, e.g., resources in a sub-station, for delivering power to the locations $302_1$-$302_N$ based on the information received from one or more of the gateways $102_1$-$102_N$. After allocating and/or scheduling resources for a particular period of time, the exemplary steps may return to step 504.

Figure 5B:
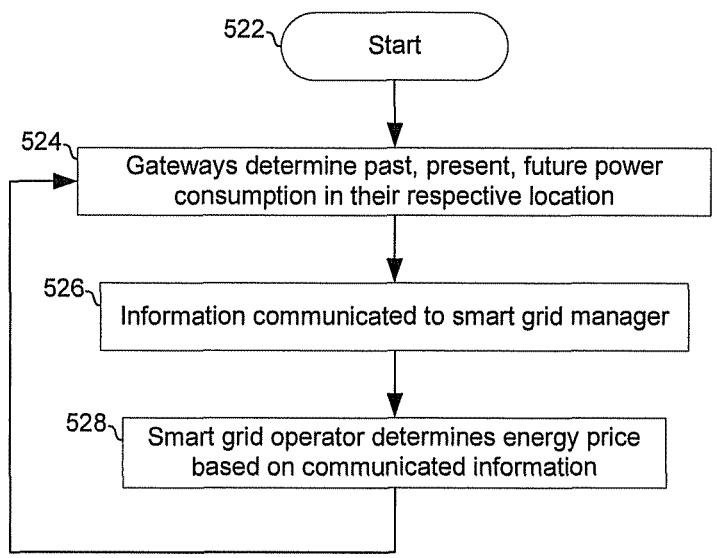
FIG. 5B is a flowchart illustrating determining energy pricing based on interaction among broadband gateways, in accordance with an embodiment of the invention.

FIG. 5B is a flowchart illustrating determining energy pricing based on interaction among broadband gateways, in accordance with an embodiment of the invention. Referring to FIG. 5, after start step 522, in step 524, each of the gateways $102_1$-$102_N$ may monitor usage and/or activity in its respective one of the locations $302_1$-$302_N$. In this regard, each gateway $102_X$ may collect information regarding past power-consuming activities, present power-consuming activities, and future power-consuming activities in the location $302_X$. Future power-consuming actives may be determined utilizing, for example, a calendar and/or clock function of the gateway $102_X$. The gateway 102 may also be operable to prioritize future power-consuming activities. For example, activates may be classified as "required" or "desired." Information collected and/or generated during step 504 may be utilized to determine past, present, and/or expected/predicted power consumption in the location $302_X$.

In step 526, one or more of the gateways $102_1$-$102_N$ may communicate the determined past, present, and/or predicted power consumption information to a network of an entity that manages a power distribution system (a "smart grid" manager).

In step 528, the smart grid manager may utilize the past, present, and/or predicted power consumption of the locations $302_1$-$302_N$ to determine how much to charge the locations $302_1$-$302_N$ for past, present, and/or future power. For example, in an instance that the predicted aggregate peak power consumption of the locations $302_1$-$302_N$ for a future time period is below a threshold, the smart grid operator may offer power to the locations $302_1$-$302_N$ at a discount.

Various aspects of a method and system for managing power consumption utilizing inter-gateway communication are provided. In an exemplary embodiment of the invention, In this regard, a first broadband gateway $102_1$ residing in a first location $302_1$ may determine past, present, and/or expected power consumption of the location $302_1$ in which it resides. The gateway $102_1$ may receive, from one or more other broadband gateways $102_2$-$102_N$ residing in one or more other locations $302_2$-$302_N$, information that enables determining past, present, and/or expected power consumption of the other location(s) $302_2$-$302_N$. The gateway $102_1$ may control power consumption in the first location $302_1$ based on the results of the determining and based on the received information. The gateway $102_1$ may communicate the results of the determining to the one or more other broadband gateways $102_2$-$102_N$. The gateway $102_1$ may control power consumption in the first location $302_1$ by controlling a state of operation of a plurality of electronic devices 104 residing in the first location $302_1$.

The results of the determining and/or the information that enables determining past, present, and/or expected power consumption in the other location(s) $302_2$-$302_N$ may be communicated to an entity 142 that manages a power grid. The entity 142 that manages the power grid may allocate resources for delivering power to the first location $302_1$ and to the other location(s) $302_2$-$302_N$ based on the results of the determining and based on the information that enables determining past, present, and/or expected power consumption in the other location(s) $302_2$-$302_N$. The entity may determine a price per unit, for example per kWh, of electricity delivered to the first location $302_1$ and to the other location(s) $302_2$-$302_N$ based on the results of the determining and on the information that enables determining past, present, and/or expected power consumption in the other location(s) $302_2$-$302_N$.

The gateway $102_1$ may determine aggregate power consumption of the first location $302_1$ and the other location(s) $302_2$-$302_N$. The gateway $102_1$ may control power consumption in the first location $302_1$ by scheduling downloading and/or consumption of content to occur at time periods of lower aggregate power consumption. The gateway $102_1$ may control power consumption in the first location $302_1$ by enabling operation of one or more appliances in the first location $302_1$ during periods of lower aggregate power consumption and disabling operation of the appliances 104*i* during periods of higher aggregate power consumption. The broadband gateway $102_1$ may be operable to handle multiple concurrent physical layer connections 108 to one or more network access service providers.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for managing power consumption via inter-gateway communication.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for networking utilizing inter-gateway communication, the method comprising:
   in a first broadband gateway that enables communication with a plurality of devices, wherein said first broadband gateway is operable to handle at least one physical layer connection to at least one corresponding network access service provider:
      receiving, via the at least one corresponding network access service provider, a first amount of information associated with a past consumption of power and a present consumption of power of a first location in which said first broadband gateway resides;
      receiving, from a second broadband gateway residing in a second location, a second amount of information associated with a past consumption of power and a present consumption of power of said second location in which said second broadband gateway resides;
      determining, utilizing said first amount of information and said second amount of information, an expected power consumption of said first location; and
      controlling actual power consumption of said first location utilizing at least said expected power consumption of said first location by configuring a state of power usage for at least a portion of said plurality of devices, wherein configuring said state of power usage of a respective one of said plurality of devices further comprises:
         identifying a type of said respective one of said plurality of devices; and
         configuring said state of power usage of said respective one of said plurality of devices utilizing a capability of said type of said respective one of said plurality of devices.

2. The method according to claim 1, wherein said at least one physical layer connection comprises a plurality of physical layer connections and said at least one corresponding network access service provider comprises a plurality of corresponding access service providers, and
   wherein each of said plurality of physical layer connections corresponds to a respective one of said plurality of corresponding access service providers.

3. The method according to claim 1, further comprising communicating said expected power consumption of said first location to one or more other broadband gateways.

4. The method according to claim 1, further comprising receiving, from one or more other broadband gateways residing in one or more other locations, information that enables determining a past consumption of power, a present consumption of power, or an expected power consumption of each of said one or more other locations.

5. The method according to claim 4, wherein:
   said expected power consumption of said first location is communicated to an entity that manages a power grid; and
   said information associated with said past consumption of power and said present consumption of power used in determining said expected power consumption of each of said one or more other locations is communicated to said entity that manages said power grid.

6. The method according to claim 5, wherein said entity allocates a plurality of resources for delivering power to said first location and to said one or more other locations based on said information associated with said past consumption of power and said present consumption of power used in determining said expected power consumption of each of said one or more other locations.

7. The method according to claim 5, wherein said entity determines a price per unit of electricity delivered to said first location and to said one or more other locations based on said information associated with said past consumption of power and said present consumption of power used in determining said expected power consumption of each of said one or more other locations.

8. The method according to claim 4, further comprising determining an aggregate power consumption of said first location and said one or more other locations.

9. The method according to claim 8, further comprising controlling said aggregate power consumption of said first location by scheduling a download or consumption of content at said first location to occur at time periods of lower aggregate power consumption.

10. The method according to claim 8, comprising controlling said aggregate power consumption of said first location by:

enabling operation of said at least a portion of said plurality of devices at said first location during time period of lower aggregate power consumption; and disabling operation of said at least a portion of said plurality of devices at said first location during periods of higher aggregate power consumption.

11. A system for networking utilizing inter-gateway communication, the system comprising:
one or more circuits for use in a first broadband gateway that enables communication with a plurality of devices, said one or more circuits being operable to:
handle at least one physical layer connection to at least one corresponding network access service provider;
receive, via the at least one corresponding network access service provider, a first amount of information associated with a past consumption of power and a present consumption of power of a first location in which said first broadband gateway resides;
receive, from a second broadband gateway residing in a second location, a second amount of information associated with a past consumption of power and a present consumption of power of said second location in which said second broadband gateway resides;
determine, utilizing said first amount of information and said second amount of information, an expected power consumption of said first location; and
control an actual power consumption of said first location utilizing at least said expected power consumption of said first location by configuring a state of power usage for at least a portion of said plurality of devices, wherein configured said state of power usage of a respective one of said plurality of devices further comprises:
identifying a type of said respective one of said plurality of devices; and
configured said state of power usage of said respective one of said plurality of devices utilizing a capability of said type of said respective one of said plurality of devices.

12. The system according to claim 11, wherein said at least one physical layer connection comprises a plurality of physical layer connections and said at least one corresponding network access service provider comprises a plurality of corresponding access service providers, and
wherein each of said plurality of physical layer connections corresponds to a respective one of said plurality of corresponding access service providers.

13. The system according to claim 11, wherein said one or more circuits are operable to communicate said expected power consumption of said first location to said one or more other broadband gateways.

14. The system according to claim 11, wherein said one or more circuits are operable to receive, from one or more other broadband gateways residing in one or more other locations, information that enables determining past consumption of power, present consumption of power, ore expected power consumption of each of said one or more other locations.

15. The system according to claim 14, wherein:
said results power communicated of said first location is communicated to an entity that manages a power grid; and
said information associated with said past consumption of power and said present consumption of power used in determining said expected power consumption of each of said one or more other locations is communicated to said entity that manages said power grid.

16. The system according to claim 15, wherein said entity allocates a plurality of resources for delivering power to said first location and to said one or more other locations based on said information associated with said past consumption of power and said present consumption of power used in determining said expected power consumption of each of said one or more other locations.

17. The system according to claim 15, wherein said entity determines a price per unit of electricity delivered to said first location and to said one or more other locations based on said information associated with said past consumption of power and said present consumption of power used in determining said expected power consumption of each of said one or more other locations.

18. The system according to claim 14, wherein said one or more circuits are operable to determine an aggregate power consumption of said first location and said one or more other locations.

19. The system according to claim 18, wherein said one or more circuits are operable to control said aggregate power consumption of said first location by scheduling downloading or consumption of content at said first location to occur at time periods of lower aggregate power consumption.

20. The system according to claim 18, wherein said one or more circuits are operable to control said aggregate power consumption of said first location by
enabling operation of said at least a portion of said plurality of devices at said first location during periods of lower aggregate power consumption; and
disabling operation of said at least a portion of said plurality of devices at said first location during periods of higher aggregate power consumption.

21. A non-transitory computer-readable medium embodying a program executable in at least one computing device for networking utilizing inter-gateway communication, comprising code that, when executed, causes the at least one computing device to:
receive, via the at least one corresponding network access service provider, a first amount of information associated with a past consumption of power and a present consumption of power of a first location in which a first broadband gateway resides, the broadband gateway configured to service a plurality of devices;
receive, from a second broadband gateway residing in a second location, a second amount of information associated with a past consumption of power and a present consumption of power of the second location in which the second broadband gateway resides;
determine, utilizing the first amount of information and the second amount of information, an expected power consumption of the first location; and
control an actual power consumption of the first location utilizing at least the expected power consumption of the first location by configuring a state of power usage for at least a portion of the plurality of devices, wherein configuring the state of power usage of a respective one of the plurality of devices further comprises:
identifying a type of the respective one of the plurality of devices; and
configuring the state of power usage of the respective one of the plurality of devices utilizing a capability of the type of the respective one of the plurality of devices.

22. The computer-readable medium of according to claim 21, the program further comprising code that communicates the expected power consumption of the first location to one or more other broadband gateways.

* * * * *